US008457911B2

(12) United States Patent
Parikh et al.

(10) Patent No.: US 8,457,911 B2
(45) Date of Patent: *Jun. 4, 2013

(54) SYSTEMS, METHODS AND APPARATUS FOR INDEXING AND PREDICTING WIND POWER OUTPUT FROM VIRTUAL WIND FARMS

(75) Inventors: Anish Parikh, Longmont, CO (US); Dan Rowlands, London (GB); Roman Binter, London (GB)

(73) Assignee: Onsemble, LLC, Niwot, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,898

(22) Filed: Apr. 20, 2012

(65) Prior Publication Data
US 2013/0060472 A1 Mar. 7, 2013

Related U.S. Application Data

(63) Continuation of application No. 13/224,859, filed on Sep. 2, 2011, now Pat. No. 8,185,331.

(51) Int. Cl.
*G01R 21/00* (2006.01)
*G06F 17/18* (2006.01)

(52) U.S. Cl.
USPC ............... 702/60; 290/44; 290/55; 702/179; 702/182

(58) Field of Classification Search
USPC ............... 702/3, 33, 60, 141, 142, 173, 179, 702/182, 183; 73/1.29, 1.34; 290/43, 44, 290/54, 55; 415/15; 416/61; 700/286; 705/38
See application file for complete search history.

(56) References Cited

U.S. PATENT DOCUMENTS

| 5,225,712 | A  | * | 7/1993 | Erdman | 290/44 |
|---|---|---|---|---|---|
| 5,982,046 | A | * | 11/1999 | Minh | 290/55 |
| 6,975,925 | B1 | * | 12/2005 | Barnes et al. | 700/286 |
| 7,016,784 | B2 | | 3/2006 | Allen et al. | |
| 7,228,235 | B2 | * | 6/2007 | Grzych et al. | 702/3 |
| 8,088,979 | B2 | * | 1/2012 | Walsh et al. | 800/300 |
| 2005/0108150 | A1 | | 5/2005 | Pethick et al. | |
| 2010/0237617 | A1 | | 9/2010 | Vyas et al. | |

FOREIGN PATENT DOCUMENTS

WO 2011022024 A1 2/2011

OTHER PUBLICATIONS

Alexiadis, M.C., et al., "Wind Speed and Power Forecasting based on Spatial Correlation Models", IEEE Transactions on Energy Conversion, Sep. 1999, pp. 836-842, vol. 14, No. 3, Publisher: IEEE, Published in: US.

Giebel, G., "The State-Of-The-Art in Short-Term Prediction of Wind Power: A Literature Overview", Development of a Next Generation Wind Resource Forecasting System for the Large-Scale Integration of Onshore and Offshore Wind Farms, Aug. 12, 2003, p. 36 Publisher: Project ANEMOS.

(Continued)

*Primary Examiner* — John H Le
(74) *Attorney, Agent, or Firm* — Neugeboren O'Dowd PC

(57) ABSTRACT

This disclosure describes systems, methods, and apparatus for predicting electrical power output from wind farms using statistical methods and measured wind speeds near boundaries of control volumes that encompass the wind turbines of interest. These systems, methods, and apparatus can provide electrical power output predictions of up to 6, 12, 24, or 48 hours in advance of actual power reaching the grid.

19 Claims, 6 Drawing Sheets

OTHER PUBLICATIONS

Larsen, K.A., et al., "Short-Term Wind Forecasting Using Off-Site Observations", Wiley InterScience—Wind Energy, 2006, pp. 55-62, No. 9, Publisher: John Wiley & Sons, Ltd., Published in: US.

Nielsen, T.S., et al., "Prediction of Wind Power using Time-Varying Coefficient-Functions", 15th Triennial World Congress of the International Federation of Automatic Control, Jul. 21-26, 2002, p. 6, Publisher: IFAC, Published in: Barcelona.

Jacob, Riju, "International Search Report and Written Opinion re Patent Application No. PCT/US2012/052969", Dec. 5, 2012, p. 9 Published in: PCT.

* cited by examiner

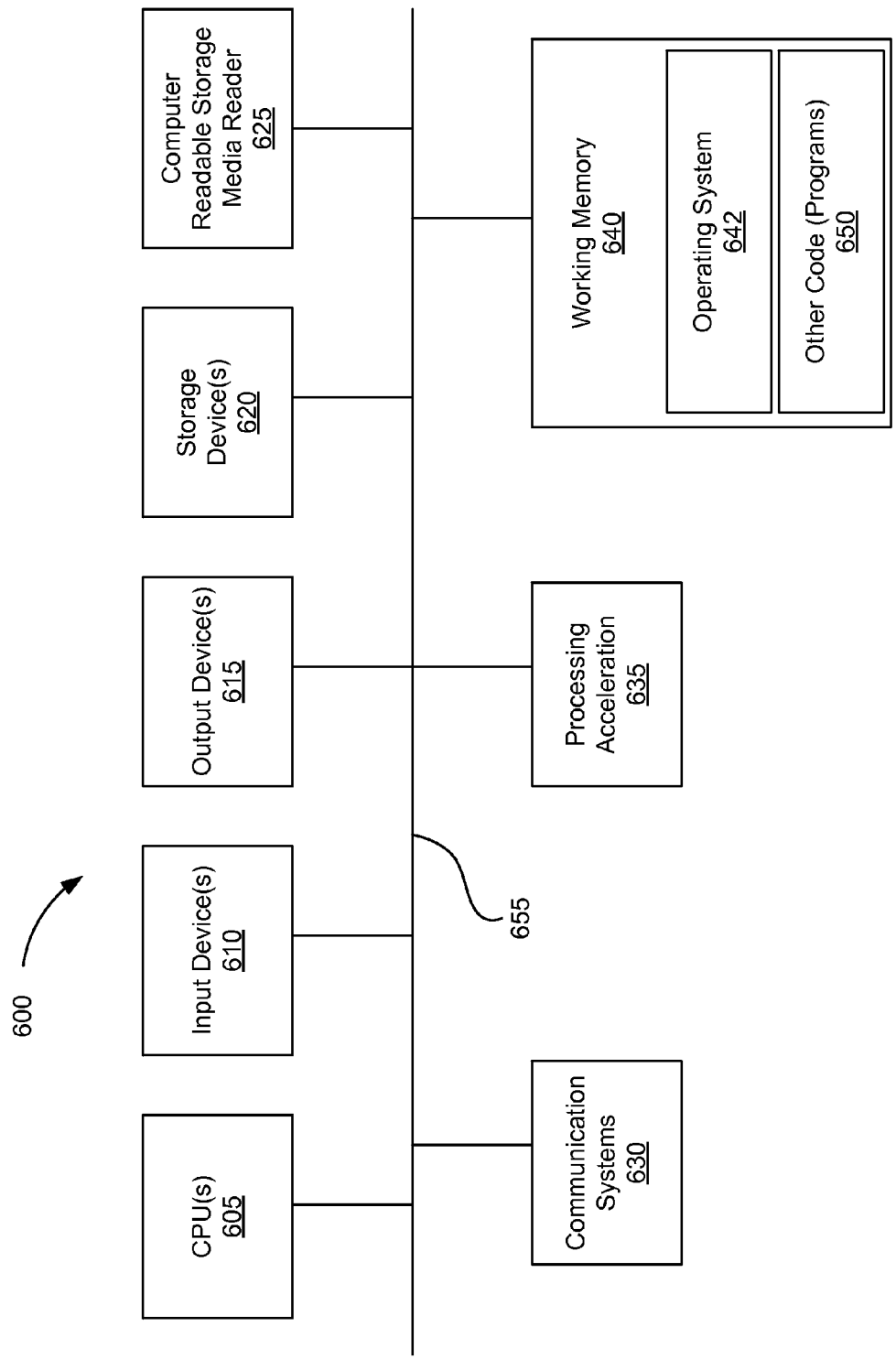

SYSTEMS, METHODS AND APPARATUS FOR INDEXING AND PREDICTING WIND POWER OUTPUT FROM VIRTUAL WIND FARMS

CROSS-REFERENCE TO RELATED APPLICATIONS

This continuation application claims the benefit of U.S. patent application Ser. No. 13/224,859, filed Sep. 2, 2011, the disclosure of which is incorporated herein by reference in its entirety.

FIELD OF THE DISCLOSURE

The present invention relates generally to improved renewable energy generation. In particular, but not by way of limitation, the present invention relates to systems, methods and apparatuses for forecasting regional wind power output and changes therein, in order to enhance efficient wind power energy usage.

BACKGROUND

Efficient use of wind-generated electrical energy can be assisted by accurate and sufficiently-early electrical power output forecasts for wind farms and regions of wind farms. Current forecasting methods do not give much advanced warning and are prone to error when there are substantial changes in power output. In other words, current forecasting methods can be ineffective when wind speeds and direction vary from established trends. The inability to sufficiently predict dynamics in electrical power output is in part due to the traditional use of numerical weather models, which are computationally-intensive and thus do not model weather patterns fast enough to handle wind dynamics.

In particular, wind speed data is typically entered into a numerical weather model in order to predict future wind speeds. The predicted wind speeds are then converted to an estimated electrical power output for each wind turbine in a given location or region by passing the data through a power curve tailored to the given wind turbines. However, the modeling is time-consuming and thus predictions tend to be inaccurate when predicting large changes in regional wind power output, especially on lead times shorter than 12 hours.

Accuracy is also hampered by the inability to obtain wind speed data at the location of every wind turbine unless one owns the wind turbines. Given the limited locations that can be used to place wind speed sensors, typical electrical power output methods are fraught with the inaccuracies of predicting wind speeds at locations other than where the sensors are located.

SUMMARY

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments of the disclosure can be characterized as a method of predicting electrical wind power output for one or more wind turbines. The method can include measuring first wind speeds at wind speed sensors over a first period of time. The first wind speeds can then be converted to first electrical power data. The method may then involve determining weights for each data point in the first electrical power data for each corresponding one of the wind speed sensors based on the first electrical power data and published wind speed data for a region encompassing the wind speed sensors. The method can further include measuring second wind speeds at the wind speed sensors over a second period of time and converting the second wind speeds to second electrical power data. Additionally, the method can involve generating weighted electrical power data by multiplying the second electrical power data by the corresponding weights.

Other embodiments of the disclosure can be characterized as a system comprising a memory, a power conversion module, a weighting module, and a summation module. The memory can store first wind speed data for a first time series, measured by a plurality of wind speed sensors. The memory can also store second wind speed data for a second time series, measured by the plurality of wind speed sensors. The power conversion module can be configured to convert the first and second wind speed data into first and second electrical wind power output data. The weighting module can determine a weight to assign to each wind speed sensor and can multiply each weight times a portion of the second electrical wind power output data associated with each weight to produce weighted electrical wind power output data. The summation module can sum the weighted electrical wind power output data for the plurality of wind speed sensors.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

FIG. 6 illustrates a machine such as a computer system in which the systems and methods herein disclosed can be implemented.

DETAILED DESCRIPTION

Figure 1:
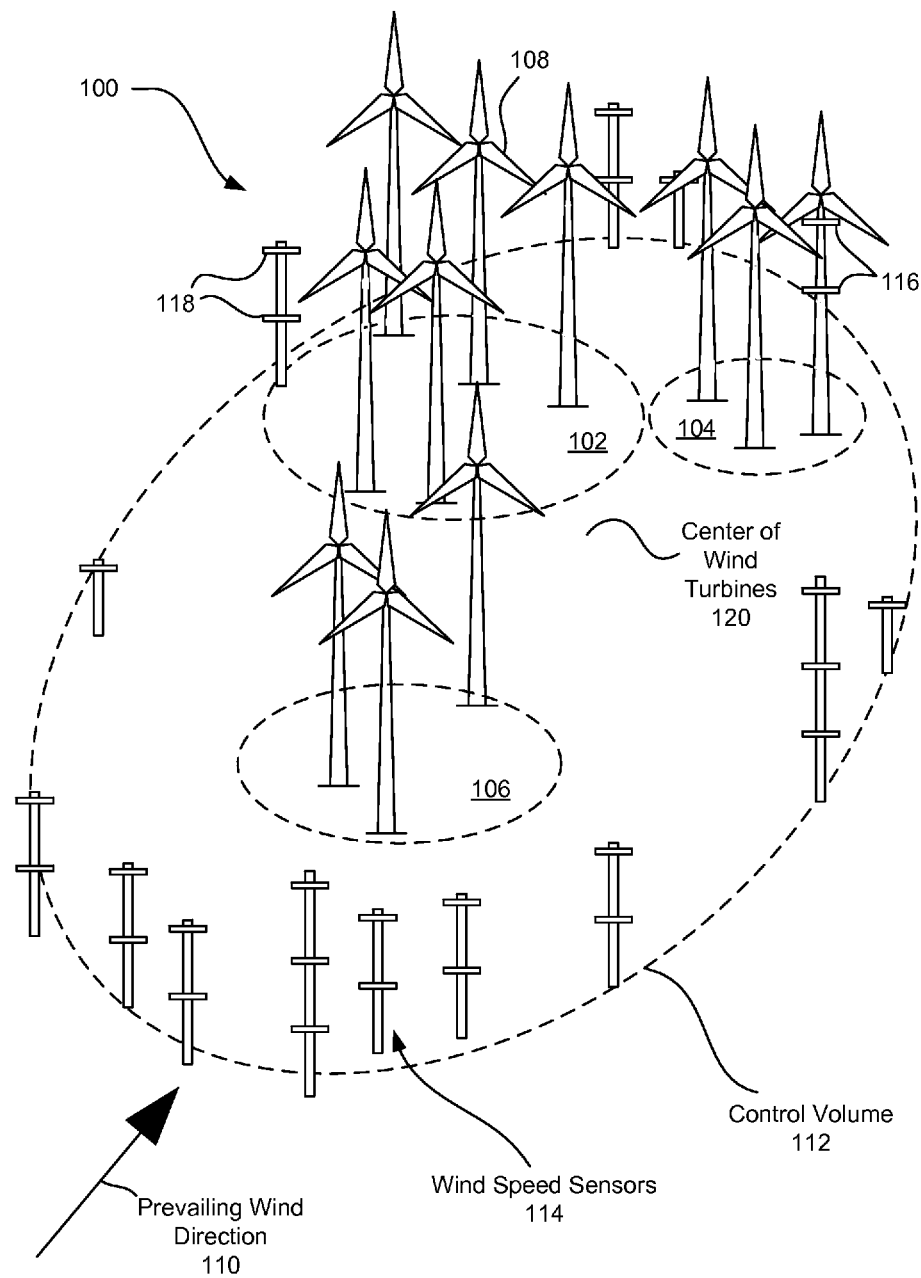
FIG. 1 illustrates one embodiment of a control volume encompassing wind turbines from a plurality of wind farms.

FIG. 1 illustrates one embodiment of a control volume encompassing wind turbines from a plurality of wind farms. The first, second, and third wind farms 102, 104, 106 are arbitrarily located and each comprises a plurality of wind turbines 108. The farms 102, 104, 106 are defined by the locations of the turbines 108, and the dashed ellipses are merely used to help distinguish the first, second, and third wind farms 102, 104, 106. The wind farms 102, 104, 106 are centered around a center of wind turbines 120 (the center 120 is an average of all wind turbine 108 locations).

The plurality of wind turbines 108 are enclosed by a control volume 112. The control volume 112 has a boundary, and the wind speed sensors 114 are located proximal to this boundary. The control volume 112 boundary tends to be further from the center of wind turbines 120 in an upwind direction (lower left of FIG. 1) and closer to the center 120 in a downwind direction (upper right of FIG. 1), where the prevailing wind direction 110 is from the lower left of FIG. 1 to the upper right. The directions, shapes, and proportions of the elements described above are merely illustrative and in no way meant to be limiting.

The wind speed sensors 114 can take a variety of forms and arrangements. In the illustrated embodiment, the wind speed sensors 114 are arranged on support structures, and there can be one or more wind speed sensors 114 fixed to each support structure. However, it should be understood that wind speed sensors 114 can also be located on the ground, on buildings, attached to stationary vehicles, affixed to wind turbines (e.g., wind speed sensors 116), or supported in any other fashion imaginable. The wind speed sensors 114 can be arranged on the control volume 112 boundary or proximal to the boundary, where "proximal" can include within 10 km or within 100 km. Some wind speed sensors can be located within wind farms 102, 104, 106, such as wind speed sensors 118.

Wind speed sensors 114 can be arranged at varying elevations ranging from ground height up to 1 km above the ground and including wind turbine hub height. Two or more wind speed sensors 114 can be arranged in the same location but at different elevations. A greater number and/or density of wind speed sensors 114 can be arranged downwind of the center 120. In other words a greater number and/or density of wind speed sensors 114 can be arranged proximal to a downwind portion of the control volume 112 boundary. Fewer wind speed sensors 114 can be arranged upwind of the center 120 proximal to an upwind boundary of the control volume 112.

The control volume 112 can encompass one or more portions of multiple wind farms 102, 104, 106, can encompass a single wind farm, or can encompass one or a few wind turbines 108. In an embodiment, the control volume 112 can encompass wind turbines 108 from two or more wind farms 102, 104, 106. The control volume 112 can have a curved or straight boundary, or a boundary comprising both curved and straight sections. In the illustrated embodiment, the boundary is elliptical, but this is in no ways meant to limit the various shapes that boundaries can take.

In an embodiment, the boundary can have an upwind portion and a downwind portion. The upwind and downwind portions can include more or less than half the circumference of the boundary and the sum of the circumferences of the upwind and downwind portions can be equal to or less than the circumference of the entire boundary. The upwind portion can on average be further from a center of the wind turbines 120 than the downwind portion. As such, wind speed sensors 114 proximal to the upwind portion of the boundary can provide a prediction of wind speeds within the control volume 112 while wind speed sensors 114 proximal to the downwind portion of the boundary can help correct the estimates of the upwind sensors 114 by measuring the wind speeds leaving the control volume 112. The wind speed sensors 114 proximal to the downwind portion of the boundary can also predict electrical power output when the wind travels opposite to the prevailing wind direction.

In an embodiment, the wind speed sensors 114 on an upwind portion of the boundary can be within an upwind distance from the majority of turbines 108 within the associated control volume 112, or from a center of the wind turbines 120. The upwind distance is a distance traversed by wind traveling at an average wind speed within the control volume 112, or an average wind speed for the region, or some other wind speed, for a set amount of time (e.g., 2, 4, 8, 12, 24, or 48 hours). In other words, the wind speed sensors 114 can be arranged such that they measure a wind speed, on average, 2, 4, 8, 12, 24, or 48 hours or less before the measured portion of wind reaches a set of wind turbines 108 or a wind farm 102, 104, 106 within the control volume 112. Thus, the boundary can be defined such that wind speed sensors 114 arranged on an upwind portion of the boundary can provide a prediction of wind speed, and thus electrical power output, for wind turbines 108 within the control volume 112. This prediction is more accurate, the closer the upwind portion of the boundary is to the wind turbines 108 and the center 120, but the prediction can be made further in advance in terms of time by moving the upwind portion of the boundary further upwind. A downwind portion of the boundary can be arranged from the center 120 at a distance that would take an average wind speed no more than two hours to traverse. Thus, the wind speed sensors 114 downwind of the wind turbines 108 and wind farms 102, 104, 106 can be closer to the wind turbines 108 and wind farms 102, 104, 106 than the upwind wind speed sensors 114.

Figure 2:
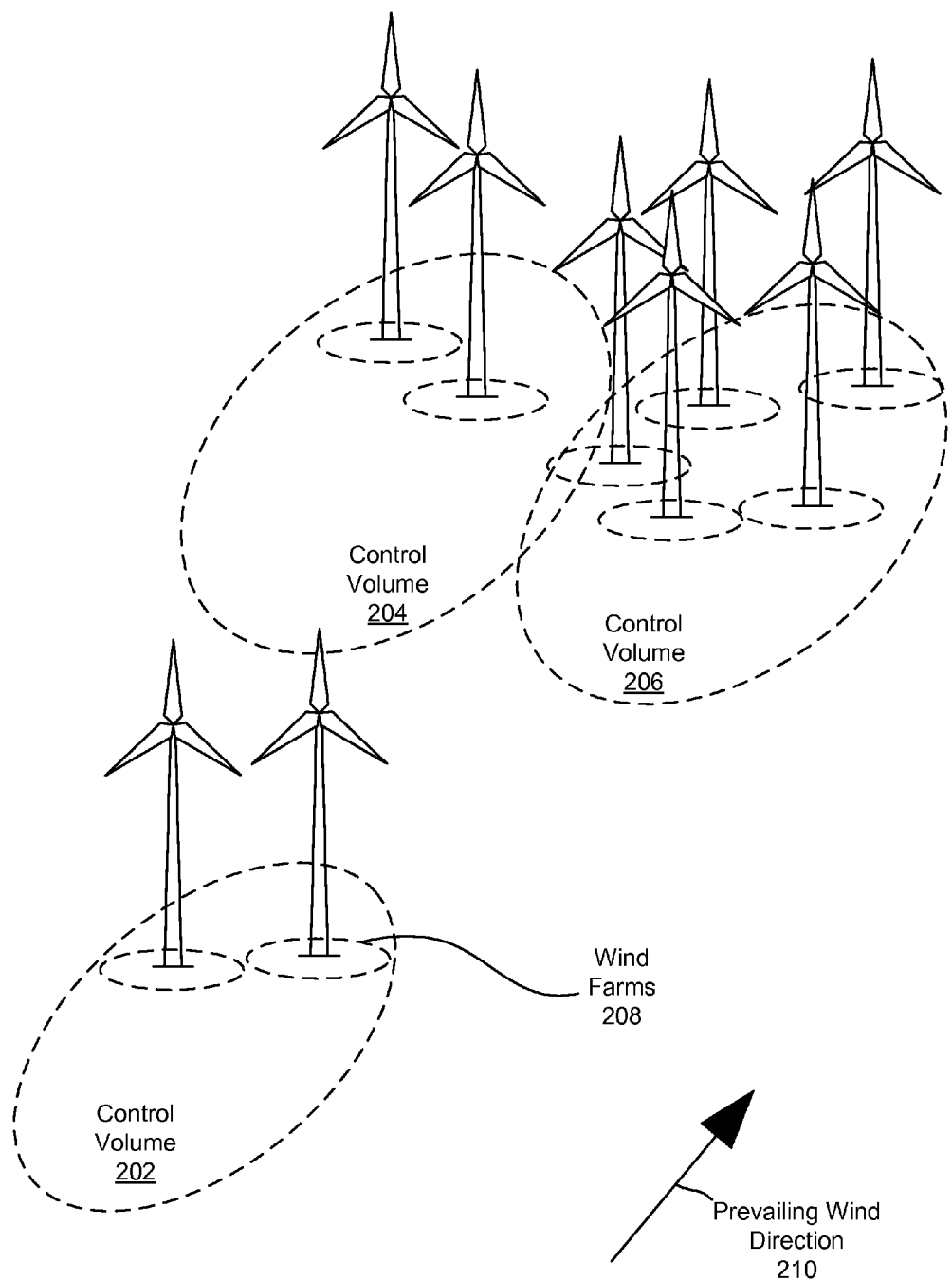
FIG. 2 illustrates a regional view of three control volumes each comprising a plurality of wind farms.

FIG. 2 illustrates a regional view of three control volumes each comprising a plurality of wind farms. In this illustration, the wind turbine symbols each represent a wind farm 208 rather than an individual wind turbine. This view shows that a region can comprise a plurality of control volumes 202, 204, 206, and those control volumes 202, 204, 206 can in some instances overlap. Each control volume 202, 204, 206 has a boundary and there are a plurality of wind speed sensors arranged proximal to that boundary. The boundaries tend to be further from the wind farms 208 on an upwind side of the control volumes 202, 204, 206.

Figure 3:
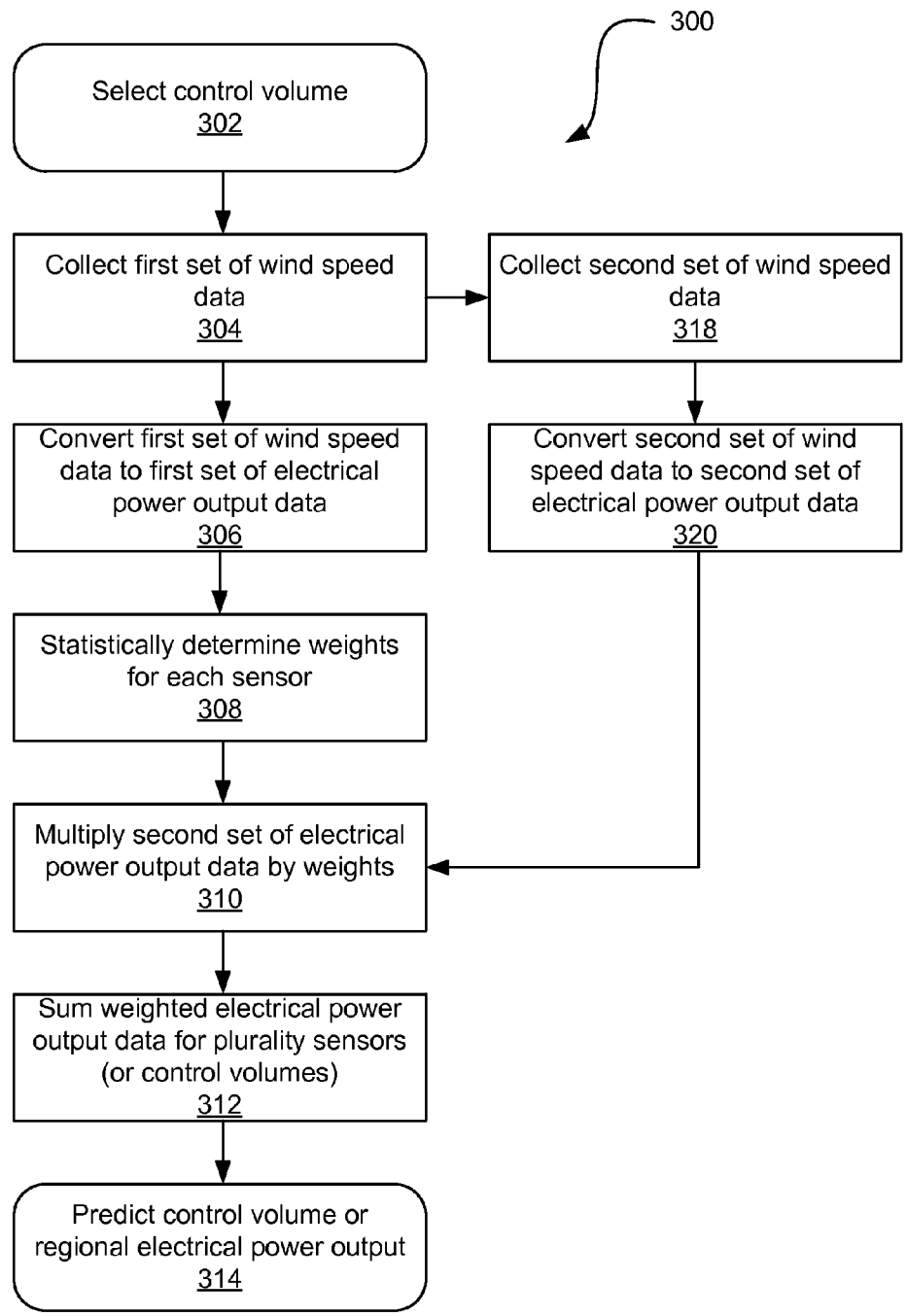
FIG. 3 illustrates a method of measuring and predicting wind power output.

FIG. 3 illustrates a method of measuring and predicting wind power output. The method 300 can make real-time estimates or forecast of an electric power output, or changes therein, for all wind farms and wind turbines in a region (or in a control volume). In an embodiment, the method 300 can estimate large or significant changes in the electric power output for all wind farms and wind turbines in a control volume. First, one or more control volumes are selected and a boundary of each is defined in a select control volume operation 302. Wind speed data is then collected from wind speed sensors arranged on or proximal to the boundary of each control volume in a first collect operation 304. In a first convert operation 306, the wind speed data is converted to a first set of estimated electrical power output by applying a power curve to the wind speed data to produce electrical power output data. A weighting factor for each sensor can then be statistically determined via determine operation 308. At some point, a second set of wind speed data is collected in a second collect operation 318. The second set of wind speed data is also converted to a second set of electrical power output data in a second convert operation 320. Multiplying the electrical power of each wind speed sensor in the second set of electrical power output data by the weighting factors determined for each sensor gives a weighted electrical power output for each sensor in multiply operation 310. Finally, a sum of the weighted electrical power output data for each sensor is calculated in a sum operation 312 thus giving an estimated electrical power output for either a control volume or a region encompassing one or more whole or partial control volumes.

Another way of looking at the method 300 is that each wind speed sensor represents a "virtual wind turbine" and the method 300 calculates a weighted electrical power that each virtual wind turbine contributes to an electrical power output of a control volume or region. Noteworthy is the determination of weighting parameters based on power rather than wind speed. In other words, determining weighting, or a wind speed sensor's statistical accuracy or contribution to a regional prediction, takes place after power conversion. Since power has a non-linear relationship to wind speed, the method 300 produces more accurate and more timely predictions than an embodiment where weighting is determined for wind speed and only later is the power conversion performed.

The control volume is selected in the select operation 302 in order to encompass a region of wind turbines and/or wind farms. The control volume can be a three dimensional space having a boundary (or control surface) encompassing wind turbines or wind farms whose predicted electrical power output is of interest. By locating wind speed sensors proximal to the boundary, wind activity within the control volume can be approximated based on wind speed data from the wind speed sensors on the boundary of the control volume. In other words, measuring wind speed entering and leaving the control volume provides an accurate estimate of wind speed within the control volume.

Given a control volume, an electrical power output for each wind speed sensor arranged proximal to the control volume boundary is determined, first by collecting wind speed data from wind speed sensors arranged proximal to a boundary of the control volume and then by converting the wind speed data into estimated electrical power output data were a wind turbine located in the same place (each wind speed sensor can be thought of as a virtual wind turbine or virtual wind farm). The wind speed data is collected in a collect first set of wind speed data operation 304. This first collect operation 304 can also involve collecting other meteorological data such as temperature, air pressure, air density, humidity, etc. since these other atmospheric qualities can also be used to more accurately convert wind speed to electrical power output. The first collect operation 304 can collect these and other meteorological data via a variety of methods including, but not limited to, conventional or propeller-based anemometers, resistance-based temperature and humidity sensors, SODARs, LIDARs, and specialty RADARs. Thus, the collect first set of wind speed data operation 304 can also involve collection of other meteorological data in addition to wind speed. The first set of wind speed data is collected over a period of time such that each data point is associated with a time. Thus, the first set of wind speed data is a time series.

The first set of wind speed data can then be converted to a first set of electrical power output data in a first convert operation 306 using a power curve (or wind turbine power curve) to estimate the electrical power output of a wind turbine located where each wind speed sensor is. Each power curve can be unique to a single wind turbine or to a make and model of wind turbine. Power curves can be provided by manufacturers or derived by users. Manufacturer power curves can even be modified in order to better estimate the electrical power output of a virtual wind turbine since there can be factors that the manufacture's power curve does not account for (e.g., a wind speed sensor located at 5 meters from the ground rather than hub height). The power curve can also depend on other meteorological factors, as mentioned above, such as temperature, humidity, air pressure, and air density (e.g., a wind turbine generates more power given the same wind speed but denser air).

While wind speed sensors provide accurate predictions of electrical power output for virtual wind turbines, they are less accurate at predicting the output of actual wind turbines which are usually located at a distance from the wind speed sensors. Ideally, one would place a wind speed sensor on every wind turbine, but this would be prohibitively expensive and often not feasible since those seeking to predict electrical power output from wind turbines are often not the same entities that own the turbines. Hence the advantages of using control volumes and virtual wind turbines. By placing wind speed sensors proximal to a boundary of a control volume, only a handful of wind speed sensors are needed to accurately predict the electrical power output of hundreds if not thousands of wind turbines (however many can be encompassed by a control volume). A weighting operation based on statistics and regression is used to assign a weighting factor to each wind speed sensor, the weighting factor indicative of a statistical correlation between a wind speed sensor's measurements and prior actual electrical power output from wind turbines. In other words, the weighting factors indicate which wind speed sensors provide the most accurate predictions of electrical power output of wind turbines. By determining and applying these weighting factors, new sets of wind speed data can be collected and used to accurately predict electrical power output from wind turbines despite the turbines being located dozens if not hundreds of miles away from the sensors and despite the fact that the number of turbines may greatly outnumber the wind speed sensors.

This weighting is performed by a determine operation 308. The determine operation 308 can perform a fitting with known electrical power output and measured wind speed data (or electrical power output data) as the inputs. In particular, a least squares fit of a weighted sum of the first set of electrical power output data (one value for each wind speed sensor or virtual wind turbine) can be used where the sum on the left side of the equation is set equal to published electrical power output data (e.g., ERCOT electrical power output data). This weighted sum can be written as follows:

$$P_t = \Sigma w_j p_{jt} \quad \text{(Equation 1)}$$

In Equation 1, the sum or electrical power output $P_t$ at time t (or estimated total electrical power output), equals the sum of weighted power for a plurality of wind speed sensors or virtual wind turbines (denoted by the subscript j) at one or more times (denoted by the subscript t). The sum is a time series comprising a plurality of values, each one corresponding to a different time (denoted by the subscript t). The electrical power output values $p_{jt}$ have one value for every time in the time series. However, the weighting parameters $w_j$ have only one value per sensor, and thus a single weighting parameter $w_j$ applies to the entire time series for a given sensor. In other words, the number of weighting factors $w_j$ is equal to j and the number of electrical power output values $p_{jt}$ is equal to j multiplied by t. In the determine operation 308, the weighting parameters $w_j$ are unknown, and a fitting algorithm such as least squares is used to solve for the weighting parameters $w_j$. This fitting can be performed for one or more control volumes depending on the region of interest for predicting electrical power output.

Once the weighting factors have been determined, they can be substituted into Equation 1 along with a new set of (or second set of) electrical power output data in a multiply operation 310 and used to predict electrical power output $P_t$ for the one or more control volumes in a sum operation 312.

The second set of wind speed data is collected in a second collect operation 318 and converted to a second set of electrical power output data in a second convert operation 320. The second collect operation 318 and the second convert operation 320 can follow the first collect operation 304, or overlap with at least part of the first collect operation 304. The second collect and convert operations 318, 320 can also take place after the first collect operation 304, and can overlap with either or both of the first convert operation 306 and the determine operation 308.

In a sum operation 312, the product of the weighting factors $w_j$ and data from the second set of electrical power output data are added in a summation to produce an estimated total electrical power output for the region encompassing all wind speed sensors used in the summation. The sum operation 312 can be performed for wind speed sensors in a single control volume or in multiple control volumes. The sum includes all wind speed sensors used in determining the weighting factors $w_j$.

Depending on the locations of the sensors and the control volumes used, this sum can provide predictions of estimated total electrical power output for a region of wind turbines or wind farms or control volumes with different degrees of advanced warning. For instance, the estimated total electrical power output $P_t$ can be used as a time-dependent index to show changes in electrical power output for a region (see for example, FIG. 4). The index shows the estimated total electrical power output $P_t$ in advance of the actual electrical power reaching the grid. The sum may provide an advanced prediction of electrical power output that can be expected from a region enclosed by a control volume or one or more regions downward of the one or more control volumes. The prediction time can vary between 0 and 48 hours and can be adjustable. For instance, the prediction time may be adjustable in fifteen-minute increments.

Once the sum operation 312 determines an estimated total electrical power output for the plurality of sensors (or for a control volume or region), the method 300 can update the weighting factors $w_j$. To do this a set of wind speed data is again collected that can be used to determine weighting factors. In an embodiment, the second set of wind speed data can be used. However, in other instances a new set of wind speed data, a third set of wind speed data, can be collected. Either way, the method 300 resumes with the first collection operation 304 (where the second or third set of wind speed data can be substituted for the first set) and progresses as described above with the second collection operation 318 using the third set of data or a fourth set of data instead of the second set of data.

In one variation, the method 300 can be expedited by removing terms from the weighted sum (Equation 1) where the weighting factor is below a threshold (e.g., 0.1 or 0.01). Such terms can be neglected since the contribution after weighting would be negligible.

The absence of a need to rely on high-performance computing used in the method 300 contributes to the speed and accuracy of the prediction, as well as the ability to anticipate large fluctuations which conventional weather models cannot. The independence from high-performance computing-based modeling allows a wind power output prediction to be made much faster since the few calculations involved in the method 300 are less time consuming than modeling traditionally used to predict wind speeds.

In an embodiment, electrical power output for a plurality of wind turbines is predicted via a statistical prediction. Traditional methods may measure wind speed, input the measurements to a numerical weather prediction model (a set of equations, such as partial differential equations, used to predict future pressure, air density, temperature, and/or wind velocity at one or more locations and altitudes) to predict future wind speeds, and then convert the predicted wind speeds to predicted electrical power output for wind turbines in the vicinity of the predicted wind speeds. In contrast, the statistical prediction herein disclosed measures a first set of wind speed data, converts the first set of wind speed data to a first set of electrical power output data, determines a statistical correlation between the first set of wind speed data and a cumulative electrical power output for wind turbines whose electrical power output is to be predicted, measures a second set of wind speed data, converts the second set of wind speed data to a second set of electrical power output data, and uses the second set of electrical power output data with the statistical correlation to predict electrical power output for the wind turbines.

In particular, determining the statistical correlation involves determining a weight to assign to each wind speed sensor where the weight represents a correlation between a wind speed measurement for each sensor and the cumulative electrical power output for the wind turbines whose electrical power output is to be predicted. In other words, wind speed sensors that measure wind speed that is a good predictor of electrical power output are assigned greater weights. This determination can be carried out via a fitting such as a least squares fitting algorithm. The weights can then be multiplied by the second set of electrical power output data, and a sum of the weights times the second set of electrical power output data is found. This sum, which can be referred to as an index, represents a 0-48 hour advanced prediction of electrical power output for the wind turbines.

Figure 4:
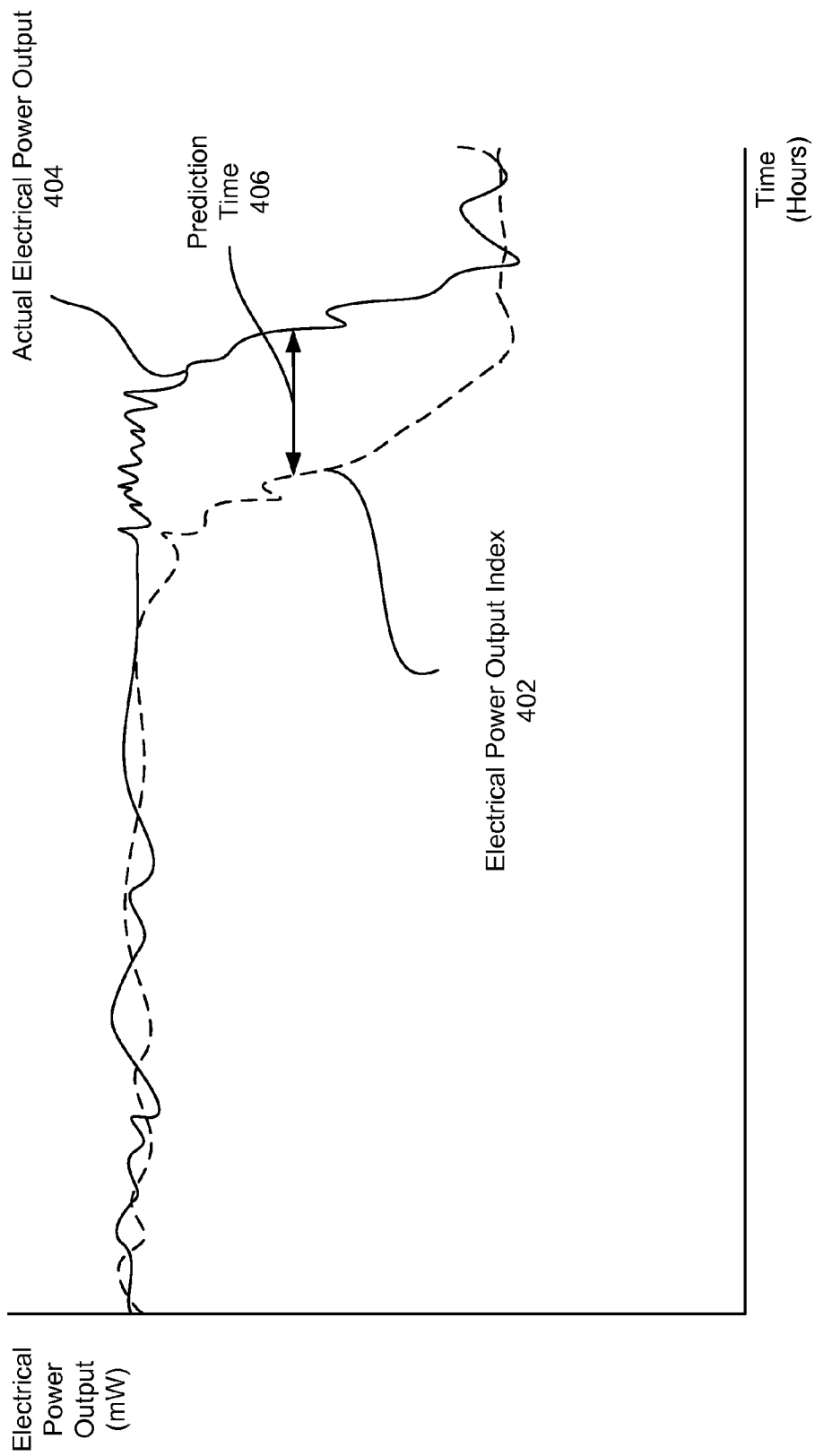
FIG. 4 is a chart depicting exemplary actual electrical power output per published data along with an exemplary electrical power output index generated according to a method of this disclosure.

FIG. 4 is a chart 400 depicting exemplary actual electrical power output 404 per published data along with an exemplary electrical power output index 402 generated according to a method of this disclosure. The chart 400 displays electrical power output in megawatts (y-axis) as a function of time in hours (x-axis). The electrical power output index 402 is a time series of the total estimated electrical power output $P_t$ as discussed with regards to FIG. 3 and Equation 1. The actual electrical power output 404 represents data generated by the electrical grid operator(s) and published. As seen, the index 402 and the actual output 404 track very closely for a while and then the power drops off with the index 402 predicting the power drop by a prediction time 406 (e.g., 6, 12, 24, or 48 hours).

Figure 5:
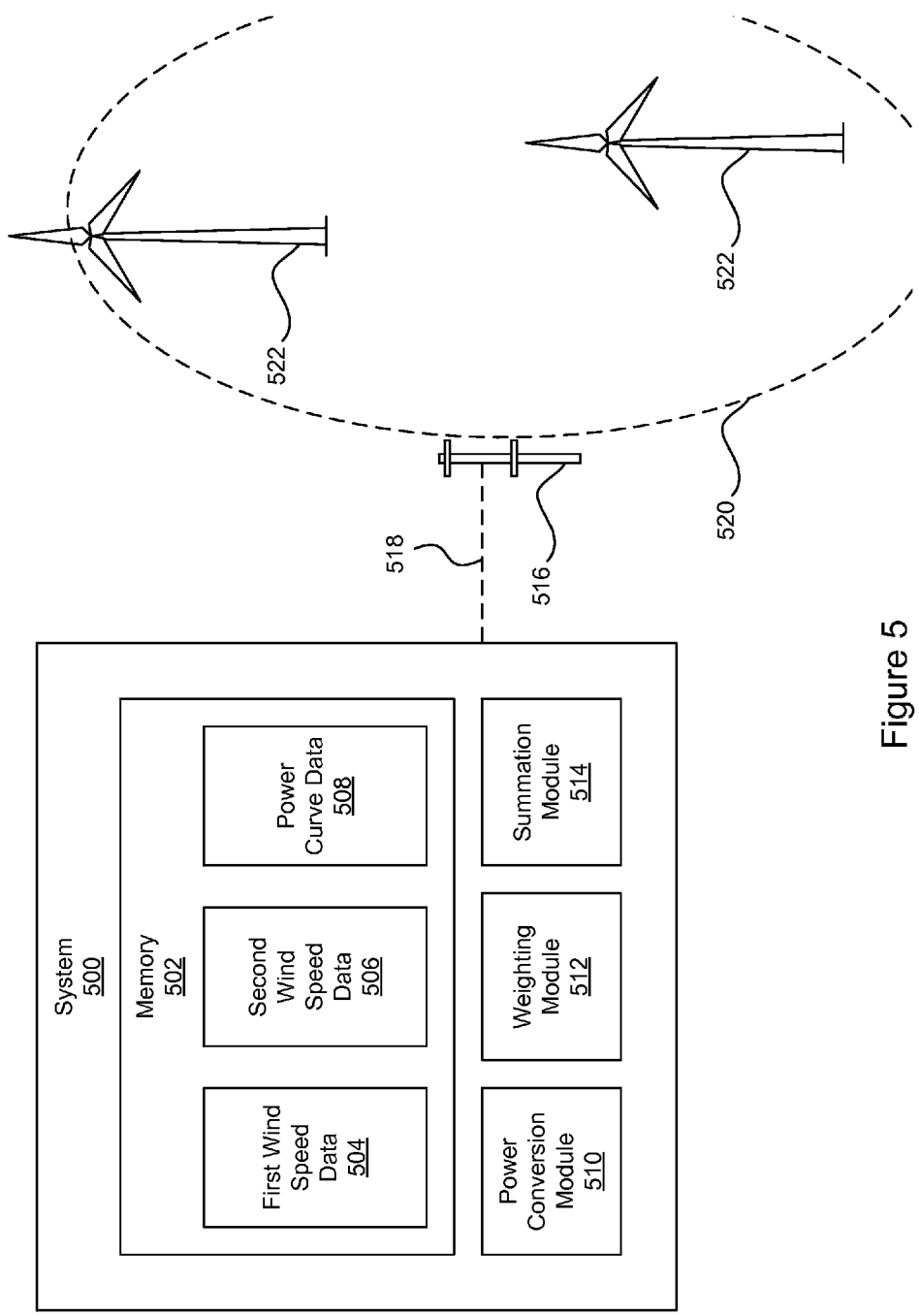
FIG. 5 illustrates a system for forecasting electrical wind power output.

FIG. 5 illustrates a system 500 for forecasting electrical wind power output for one or more wind turbines 522, wind farms, or a region of wind farms. The system can include a memory 502 storing a first wind speed data 504, a second wind speed data 506, and power curve data 508. The system 500 can also include a power conversion module 510, a weighting module 512, and a summation module 514.

The first wind speed data 504 can store wind speeds for a first time series (e.g., wind speeds measured between a first time and a second time in periodic increments). The first wind speed data 504 can thus be stored as discrete data points or as a vector. The first wind speed data 504 can also include further meteorological data such as wind direction, humidity, temperature, air density, air pressure, etc. The first wind speed data 504 is measured by a plurality of wind speed sensors in communication with the system 500 via a wired or wireless communication path 518. Two such wind speed sensors 516 are illustrated on a single support. The wind speed sensors can be arranged proximal to a control volume boundary 520 enclosing one or more wind turbines 522.

The second wind speed data 506 can store wind speeds for a second time series (e.g., wind speeds measured between a third time and a fourth time in periodic increments). The second wind speed data 506 can thus be stored as discrete data points or as a vector. The second wind speed data 506 can also include further meteorological data such as wind direction, humidity, temperature, air density, air pressure, etc. The second wind speed data 506, like the first wind speed data 504, is measured by the plurality of wind speed sensors, only two of these wind speed sensors 516 are illustrated. The second wind speed data 506 can overlap with the first wind speed data 504. For instance, the second wind speed data 506 can be the same data as the first wind speed data 504, in other words a second set of measurements need not be made. Alternatively, some of the first wind speed data 504 can be used to populate a portion of the second wind speed data 506 while the rest of the second wind speed data 506 is measured at times other than when the first wind speed data 506 is measured.

Power curve data 508 can describe a power curve of the one or more wind turbines 522 in the control volume 520. Alternatively, the power curve data 508 can describe a power curve for the control volume 520. For instance, where different wind turbines 522 operate within the same control volume 520, it may be preferable to use a single power curve to represent the entire control volume 520, where the power curve is an average power curve of the power curves for the individual wind turbines 522. Alternatively, the power curve for the control volume 520 can be some other modification of the power curves for the individual wind turbines 522 other than an average (e.g., a weighted average).

The power conversion module 510 can be configured to convert the first and second sets of wind speed data 504, 506 into first and second electrical wind power output data. The power conversion module 510 performs this conversion using the power curve described by the power curve data 508.

The weighting module 512 determines a weight to assign to each wind speed sensor and multiplies each weight times a portion of the second electrical wind power output data associated with each weight to produce weighted electrical wind power output data. In other words, for each second electrical wind power output data point, the weighting module 512 multiplies a weight times that data point, where the weight is determined for the wind speed sensor that generated the data point. These multiplied terms are then summed by the summation module 514.

The system 500 can be embodied in a computing device such as a standalone personal computer, a laptop, a server, or an embedded system. The system 500 can be embodied in hardware, software, firmware, or a combination of these.

FIG. 6 illustrates a machine such as a computer system in which the systems and methods herein disclosed can be implemented. The systems and methods described herein can be implemented in a machine such as a computer system in addition to the specific physical devices described herein. FIG. 6 shows a diagrammatic representation of one embodiment of a machine in the exemplary form of a computer system 600 within which a set of instructions for causing a device to perform any one or more of the aspects and/or methodologies of the present disclosure to be executed. Computer system 600 includes a processor 605 and a memory 610 that communicate with each other, and with other components, via a bus 615. Bus 615 may include any of several types of bus structures including, but not limited to, a memory bus, a memory controller, a peripheral bus, a local bus, and any combinations thereof, using any of a variety of bus architectures.

Memory 610 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 620 (BIOS), including basic routines that help to transfer information between elements within computer system 600, such as during start-up, may be stored in memory 610. Memory 610 may also include (e.g., stored on one or more machine-readable media) instructions (e.g., software) 625 embodying any one or more of the aspects and/or methodologies of the present disclosure. In another example, memory 610 may further include any number of program modules including, but not limited to, an operating system, one or more application programs, other program modules, program data, and any combinations thereof.

Computer system 600 may also include a storage device 630. Examples of a storage device (e.g., storage device 630) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 630 may be connected to bus 615 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 630 may be removably interfaced with computer system 600 (e.g., via an external port connector (not shown)). Particularly, storage device 630 and an associated machine-readable medium 635 may provide nonvolatile and/or volatile storage of machine-readable instructions, data structures, program modules, and/or other data for computer system 600. In one example, software 625 may reside, completely or partially, within machine-readable medium 635. In another example, software 625 may reside, completely or partially, within processor 605. Computer system 600 may also include an input device 640. In one example, a user of computer system 600 may enter commands and/or other information into computer system 600 via input device 640. Examples of an input device 640 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen, and any combinations thereof. Input device 640 may be interfaced to bus 615 via any of a variety of interfaces (not shown) including, but not limited to, a serial interface, a parallel interface, a game port, a USB interface, a FIREWIRE interface, a direct interface to bus 615, and any combinations thereof.

A user may also input commands and/or other information to computer system 600 via storage device 630 (e.g., a removable disk drive, a flash drive, etc.) and/or a network interface device 645. A network interface device, such as network interface device 645 may be utilized for connecting computer system 600 to one or more of a variety of networks, such as network 650, and one or more remote devices 655 connected thereto. Examples of a network interface device include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 650, may employ a wired and/or a wireless mode of communication. In general, any network topology may be used. Information (e.g., data, software 625, etc.) may be communicated to and/or from computer system 600 via network interface device 645.

Computer system 600 may further include a video display adapter 660 for communicating a displayable image to a display device, such as display device 665. A display device may be utilized to display any number and/or variety of indicators related to pollution impact and/or pollution offset attributable to a consumer, as discussed above. Examples of a display device include, but are not limited to, a liquid crystal display (LCD), a cathode ray tube (CRT), a plasma display, and any combinations thereof. In addition to a display device, a computer system 600 may include one or more other peripheral output devices including, but not limited to, an audio speaker, a printer, and any combinations thereof. Such peripheral output devices may be connected to bus 615 via a peripheral interface 670. Examples of a peripheral interface include, but are not limited to, a serial port, a USB connection, a FIREWIRE connection, a parallel connection, and any combinations thereof. In one example an audio device may provide audio related to data of computer system 600 (e.g., data representing an indicator related to pollution impact and/or pollution offset attributable to a consumer).

In conclusion, the present invention provides, among other things, a method, system, and apparatus that enables real-time predictions of electrical power output from wind turbines via use of remotely-located wind speed sensors. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention.

What is claimed is:

1. A method of predicting electrical wind power output for one or more wind turbines comprising:
    measuring first wind speeds at wind speed sensors over a first period of time;
    converting the first wind speeds to first electrical power data;
    determining weights for each data point in the first electrical power data for each corresponding one of the wind speed sensors based on the first electrical power data and published wind power data for a region encompassing the wind speed sensors;
    measuring second wind speeds at the wind speed sensors over a second period of time;
    converting the second wind speeds to second electrical power data; and
    generating weighted electrical power data by multiplying the second electrical power data by the corresponding weights.

2. The method of claim 1, wherein both converting operations further comprise applying one or more power curves, where each power curve represents at least one of the wind turbines.

3. The method of claim 2, wherein the power curve is representative of two or more wind turbines, where the two or more wind turbines each have different power curves.

4. The method of claim 1, wherein the first wind speeds and the second wind speeds at least partially overlap.

5. The method of claim 1, wherein the wind speed sensors are arranged proximal to boundaries of one or more control volumes enclosing one or more wind turbines or wind farms.

6. The method of claim 5, wherein for each control volume, a greater portion of the control volume is upwind of wind turbines within the control volume than a portion of the control volume downwind of those wind turbines.

7. The method of claim 6, wherein a majority of the wind speed sensors are arranged proximal to an upwind portion of the boundary.

8. The method of claim 1, further comprising predicting electrical power output from a region encompassing the plurality of wind speed sensors.

9. The method of claim 8, wherein the predicting precedes actual electrical power output by 0-48 hours.

10. The method of claim 1, wherein at least some of the wind speed sensors are arranged at a wind turbine hub height.

11. The method of claim 1, wherein at least some of the wind speed sensors are arranged above a wind turbine hub height.

12. The method of claim 1, further comprising summing the weighted electrical power output data for the plurality of wind speed sensors.

13. The method of claim 1, wherein at least one of the control volumes encompasses a wind farm.

14. The method of claim 13, wherein equivalent weights are assigned to data points corresponding to wind speed sensors within the same control volume.

15. The method of claim 1, wherein at least one of the control volumes encompasses a portion of two or more wind farms.

16. The method of claim 1, further comprising, periodically updating the weights by repeating the measuring first wind speeds operation and the determining weights operation.

17. A system comprising:
    a memory for storing:
        first wind speed data for a first time series, measured by a plurality of wind speed sensors; and
        second wind speed data for a second time series, measured by the plurality of wind speed sensors;
    a power conversion module configured to convert the first and second wind speed data into first and second electrical wind power output data;
    a weighting module that:
        determines a weight to assign to each wind speed sensor; and
        multiplies each weight times a portion of the second electrical wind power output data associated with each weight to produce weighted electrical wind power output data; and
    a summation module that sums the weighted electrical wind power output data for the plurality of wind speed sensors.

18. The system of claim 17, wherein the weight is an updated weight.

19. The system of claim 17, wherein each wind speed sensor is arranged proximal to a control volume boundary enclosing one or more wind turbines.

* * * * *